United States Patent
Zhang et al.

(10) Patent No.: US 12,421,579 B2
(45) Date of Patent: Sep. 23, 2025

(54) SIX-MEMBERED HIGH-ENTROPY FOAMS FOR HYDROGEN PRODUCTION BY WATER SPLITTING AND PREPARATION METHODS THEREOF

(71) Applicant: SOUTHEAST UNIVERSITY, Jiangsu (CN)

(72) Inventors: Xuhai Zhang, Nanjing (CN); Tongheng Wang, Nanjing (CN); Yuqiao Zeng, Nanjing (CN); Peng Cui, Nanjing (CN); Chongyang Ba, Nanjing (CN); Feng Fang, Nanjing (CN); Qiyue Shao, Nanjing (CN); Haoran Zheng, Nanjing (CN); Pengcheng Zhao, Nanjing (CN); Jianqing Jiang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/940,787

(22) Filed: Nov. 7, 2024

(65) Prior Publication Data
US 2025/0122633 A1  Apr. 17, 2025

Related U.S. Application Data

(63) Continuation of application No. PCT/CN2022/139925, filed on Dec. 19, 2022.

(30) Foreign Application Priority Data

May 7, 2022 (CN) .......................... 202210490535.6

(51) Int. Cl.
*C22C 30/02* (2006.01)
*C25B 11/031* (2021.01)
(Continued)

(52) U.S. Cl.
CPC ............ *C22C 30/02* (2013.01); *C25B 11/031* (2021.01); *C25B 11/089* (2021.01); *C25D 3/56* (2013.01); *C25D 5/48* (2013.01); *C25D 5/623* (2020.08)

(58) Field of Classification Search
None
See application file for complete search history.

(56) References Cited

U.S. PATENT DOCUMENTS

2020/0269227 A1   8/2020   Schroeter et al.
2021/0260704 A1   8/2021   Hu et al.

FOREIGN PATENT DOCUMENTS

CN   101396665 A       4/2009
CN   106609346 A  *    5/2017
(Continued)

OTHER PUBLICATIONS

English language machine translation of CN-106609346-A. Generated 2025. (Year: 2025).*
(Continued)

*Primary Examiner* — Brian D Walck
(74) *Attorney, Agent, or Firm* — PORUS IP LLC

(57) ABSTRACT

Six-membered high-entropy foam for hydrogen production by water splitting and preparation method are provided. The foam consists of Ni, Fe, Cu, Co, Mo, and Pt, comprising 10 at %-25 at % of Ni, 10 at %-25 at % of Fe, 10 at %-25 at % of Cu, 10 at %-25 at % of Co, 10 at %-25 at % of Mo, and 10 at %-25 at % of Pt. Catalyst loading of the foam can reach a range of 0.8 mg/cm$^2$-3.2 mg/cm$^2$, which is much higher than the effective catalyst loading of most nano-catalysts. When used as catalyst for hydrogen production by water splitting, the hydrogen evolution overpotential of the surface of the six-membered high-entropy foam is within a range of 36 mV-60 mV, and the foam operates stably at industrial-level current density (500 mA/cm$^2$). The preparation method
(Continued)

does not require harsh environment such as high temperature or high vacuum, making the method simple and easy to implement, with low-cost raw materials.

10 Claims, 5 Drawing Sheets

(51) Int. Cl.
  *C25B 11/089* (2021.01)
  *C25D 3/56* (2006.01)
  *C25D 5/00* (2006.01)
  *C25D 5/48* (2006.01)

(56) References Cited

FOREIGN PATENT DOCUMENTS

| CN | 108435202 A | 8/2018 |
| CN | 108728876 A | 11/2018 |
| CN | 111074292 A | 4/2020 |
| CN | 111349800 A | 6/2020 |
| CN | 111621808 A | 9/2020 |
| CN | 111793806 A | 10/2020 |
| CN | 112609213 A | 4/2021 |
| CN | 113061925 A | 7/2021 |
| CN | 113774422 A | 12/2021 |
| CN | 114150330 A | 3/2022 |
| CN | 114836780 A | 8/2022 |
| JP | 2019034259 A | 3/2019 |

OTHER PUBLICATIONS

International Search Report in PCT/CN2022/139925 mailed on Feb. 10, 2023, 8 pages.
Written Opinion in PCT/CN2022/139925 mailed on Feb. 10, 2023, 7 pages.
Zhang, Zeling et al., Electrocatalytic Oxygen Evolution Performance of High Entropy FeCoNiMoCr Alloy Thin Film Electrode, Chinese Journal of Materials Research, 35(3): 193-200, 2021.
Wang, Shiqi et al., Efficient FeCoNiCuPd thin-film electrocatalyst for alkaline oxygen and hydrogen evolution reactions, Applied CatalysisB: Environmental, 2022, 13 pages.

* cited by examiner

SIX-MEMBERED HIGH-ENTROPY FOAMS FOR HYDROGEN PRODUCTION BY WATER SPLITTING AND PREPARATION METHODS THEREOF

CROSS REFERENCE TO RELATED APPLICATIONS

The present application is a continuation of International Application No. PCT/CN2022/139925, filed on Dec. 19, 2022, which claims priority to Chinese Patent Application No. 202210490535.6, filed on May 7, 2022, the entire contents of each of which are incorporated herein by reference.

TECHNICAL FIELD

The present disclosure belongs to the technical field of preparation of micro-nano materials and relates to a six-membered high-entropy foam for hydrogen production by water splitting and a preparation method thereof, and in particular, to a six-membered high-entropy foam for hydrogen production by water splitting with high activity and high stability and a preparation method thereof.

BACKGROUND

In existing technologies, hydrogen energy is one of the cleanest renewable energy sources. Among numerous clean energy sources, hydrogen energy is undoubtedly the most promising energy in replacing fossil fuels in the future, thereby establishing a new green energy system with hydrogen as the carrier.

There are many ways to obtain hydrogen energy, among which water electrolysis technology, driven by renewable energy, is an environmentally friendly technique for producing high-purity hydrogen. However, due to the high overpotential required for the hydrogen evolution reaction, catalysts must be used on the electrode materials. Pt-based materials have the most suitable hydrogen adsorption free energy (close to 0), which contributes to excellent hydrogen evolution reaction (HER) catalytic performance. However, Pt-based catalysts are not only expensive and have scarce reserves but also have poor catalytic stability in HER.

In recent years, new alloy materials have been developed by combining precious metals with non-precious metals through alloying manners, aiming to reduce the usage amount of precious metals while maintaining their excellent catalytic activity and improving catalytic stability. However, most of these materials face several issues, including complex preparation processes, low effective catalyst loading, and the need for improvements in catalytic performance.

SUMMARY

In order to solve the above problems, the present disclosure provides a six-membered high-entropy foam for hydrogen production by water splitting with high activity and high stability, the foam has good catalytic activity, which may be used in efficient and stable hydrogen production by water splitting technology. The present disclosure also provides a method for preparing a six-membered high-entropy foam for hydrogen production by water splitting with high activity and high stability, which is simple, and the NiFeCuCoMoPt high-entropy alloy prepared using the method has both nanoparticles and hierarchical porous structure.

The present disclosure may provide a six-membered high-entropy foam for hydrogen production by water splitting, comprising 10 at %-25 at % of Ni, 10 at %-25 at % of Fe, 10 at %-25 at % of Cu, 10 at %-25 at % of Co, 10 at %-25 at % of Mo, and 10 at %-25 at % of Pt.

In some embodiments, the six-membered high-entropy foam may have 3D-connected micron-scale pores.

In some embodiments, diameters of the micron-scale pores may be within a range of 0.2 um-25 um; and walls of the micron-scale pores may be composed of NiFeCuCoMoPt particles packing.

In some embodiments, sizes of the NiFeCuCoMoPt particles may be within a range of 100 nm-300 nm.

In some embodiments, catalyst loading of the six-membered high-entropy foam may be within a range of 0.8 mg/cm$^2$-3.2 mg/cm$^2$, and a hydrogen evolution overpotential of a surface of the six-membered high-entropy foam after cleaning and activation may be within a range of 36 mV-60 mV.

The present disclosure may also provide a method for preparing a six-membered high-entropy foam for hydrogen production by water splitting, comprising:

operation (1), obtaining a colorless and transparent solution by dissolving complexes $(NH_4)_2SO_4$, $Na_3C_6H_5O_7$, and $H_3BO_3$ in ultrapure water under stirring;

operation (2), obtaining a mixed solution by dissolving metal salts $NiSO_4$, $Fe_2(SO_4)_3$, $CuSO_4$, $CoSO_4$, $Na_2MoO_4$, and $K_2PtCl_4$ in the colorless and transparent solution in sequence under stirring;

operation (3), obtaining a six-membered high-entropy foam by using a Ni sheet as a working electrode and a Pt sheet as a counter electrode, controlling a temperature to 25° C., and performing constant current electrodeposition on the mixed solution;

operation (4), after the constant current electrodeposition is completed, obtaining a washed six-membered high-entropy foam by immersing the six-membered high-entropy foam in the ultrapure water to remove residual impurities on a surface of the six-membered high-entropy foam and washing for three times; and operation (5), obtaining the six-membered (NiFeCuCoMoPt) high-entropy foam by placing the washed six-membered high-entropy foam in a freeze dryer and freeze-drying for 4 h.

In some embodiments, in operation (1), in the colorless and transparent solution, a concentration of $(NH_4)_2SO_4$ may be within a range of 0.4 M-0.6 M, a concentration of $Na_3C_6H_5O_7$ may be within a range of 0.2 M-0.4 M, and a concentration of $H_3BO_3$ may be within a range of 0.3 M-0.5 M.

In some embodiments, in operation (2), in the mixed solution, a concentration of $NiSO_4$ may be within a range of 0.002 M-0.006 M, a concentration of $Fe_2(SO_4)_3$ may be within a range of 0.001 M-0.002 M, a concentration of $CuSO_4$ may be within a range of 0.0002 M-0.0006 M, a concentration of $CoSO_4$ may be within a range of 0.001 M-0.003 M, a concentration of $Na_2MoO_4$ may be within a range of 0.002 M-0.008 M, and a concentration of $K_2PtCl_4$ may be within a range of 0.002 M-0.008 M.

In some embodiments, in operation (3), a current density of the constant current electrodeposition may be within a range of 1 A/cm$^2$-4 A/cm$^2$, and a deposition time may be within a range of 90 s-360 s.

In some embodiments, in operation (4), an immersion time of the six-membered high-entropy foam in the ultrapure water may be 15 min.

The beneficial effect of the present disclosure is as follows: the six-membered high-entropy foam for hydrogen production by water splitting with high activity and high stability has the catalyst loading reaching a range of 0.8 mg/cm$^2$-3.2 mg/cm$^2$, which is much higher than the effective catalyst loading of most nano-catalysts. When used as a catalyst for hydrogen production by water splitting, the hydrogen evolution overpotential of the surface of the six-membered high-entropy foam after cleaning and activation is within a range of 36 mV-60 mV, and the six-membered high-entropy foam can operate stably at industrial-level current density (500 mA/cm$^2$), which outperforms the performance of ordinary high-entropy alloy strips and films. At the same time, the preparation method does not require harsh environment such as high temperature or high vacuum, making the method simple and easy to implement, with low-cost raw materials.

DETAILED DESCRIPTION

Figure 1:
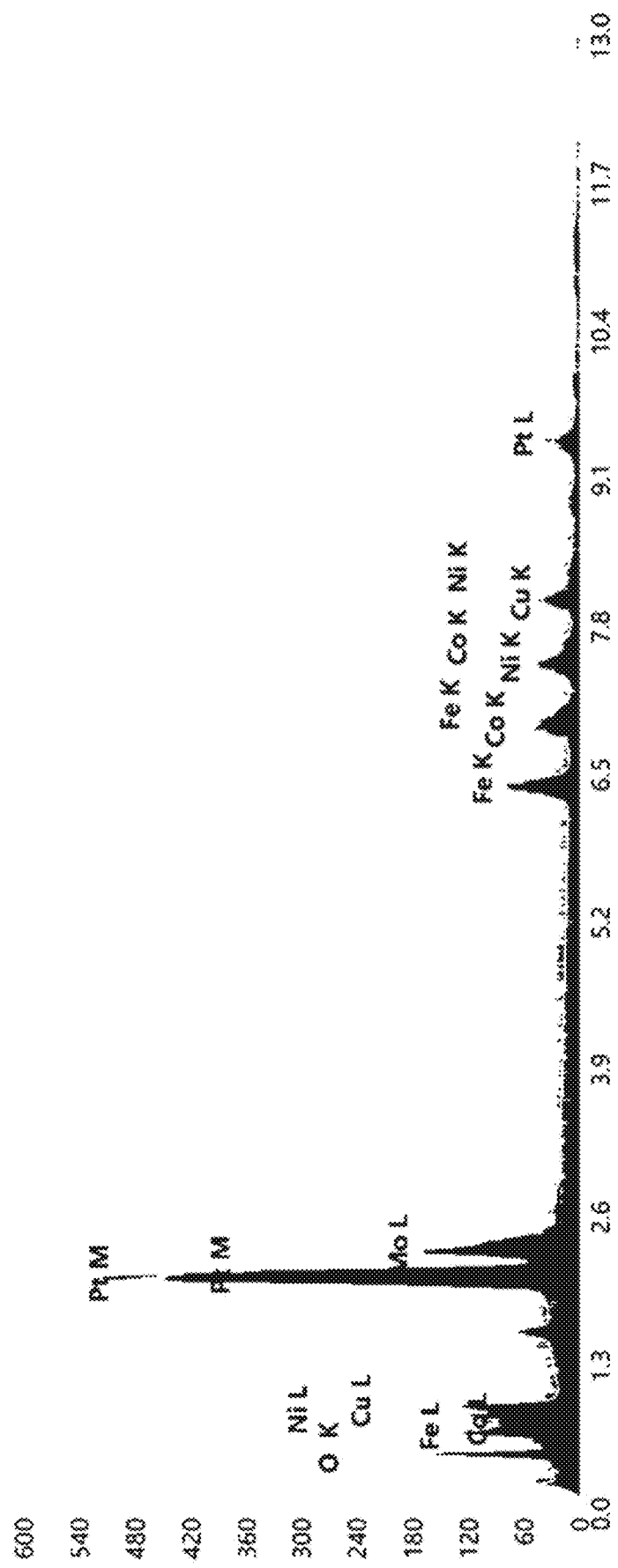
FIG. 1 is a diagram illustrating an energy spectrum of a NiFeCuCoMoPt high-entropy alloy foam according to some embodiments of the present disclosure.

In order to more clearly illustrate the technical solution of the present disclosure, the technical solution of the present disclosure is described in further detail below in conjunction with the accompanying drawings.

According to the present disclosure, a six-membered high-entropy foam for hydrogen production by water splitting comprises: 10 at %-25 at % of Ni, 10 at %-25 at % of Fe, 10 at %-25 at % of Cu, 10 at %-25 at % of Co, 10 at %-25 at % of Mo, and 10 at %-25 at % of Pt.

In some embodiments, the six-membered high-entropy foam has 3D-connected micron-scale pores.

In some embodiments, diameters of the micron-scale pores are within a range of 0.2 um-25 um; and walls of the micron-scale pores are composed of NiFeCuCoMoPt particles packing.

In some embodiments, sizes of the NiFeCuCoMoPt particles are within a range of 100 nm-300 nm.

In some embodiments, catalyst loading of the six-membered high-entropy foam is within a range of 0.8 mg/cm$^2$-3.2 mg/cm$^2$, and a hydrogen evolution overpotential of a surface of the six-membered high-entropy foam after cleaning and activation is within a range of 36 mV-60 mV, exhibiting high activity, and the foam maintains a stable overpotential at industrial-level current density (500 mA/cm$^2$), exhibiting high stability.

In some embodiments, a method for preparing the six-membered high-entropy foam for hydrogen production by water splitting, comprising:

operation (1), obtaining a colorless and transparent solution by dissolving complexes $(NH_4)_2SO_4$, $Na_3C_6H_5O_7$, and $H_3BO_3$ in ultrapure water under stirring;

operation (2), obtaining a mixed solution by dissolving metal salts $NiSO_4$, $Fe_2(SO_4)_3$, $CuSO_4$, $CoSO_4$, $Na_2MoO_4$, and $K_2PtCl_4$ in the colorless and transparent solution in sequence under stirring;

operation (3), obtaining a six-membered high-entropy foam by using a Ni sheet as a working electrode and a Pt sheet as a counter electrode, controlling a temperature to 25° C., and performing constant current electrodeposition on the mixed solution;

operation (4), after the constant current electrodeposition is completed, obtaining a washed six-membered high-entropy foam by immersing the six-membered high-entropy foam in the ultrapure water to remove residual impurities on a surface of the six-membered high-entropy foam and washing for three times; and operation (5), obtaining the six-membered (NiFeCuCoMoPt) high-entropy foam by placing the washed six-membered high-entropy foam in a freeze dryer and freeze-drying for 4 h.

In some embodiments, in operation (1), in the colorless and transparent solution, a concentration of $(NH_4)_2SO_4$ is within a range of 0.4 M-0.6 M, a concentration of $Na_3C_6H_5O_7$ is within a range of 0.2 M-0.4 M, and a concentration of $H_3BO_3$ is within a range of 0.3 M-0.5 M. In some embodiments, in operation (2), in the mixed solution, a concentration of $NiSO_4$ is within a range of 0.002 M-0.006 M, a concentration of $Fe_2(SO_4)_3$ is within a range of 0.001 M-0.002 M, a concentration of $CuSO_4$ is within a range of 0.0002 M-0.0006 M, a concentration of $CoSO_4$ is within a range of 0.001 M-0.003 M, a concentration of $Na_2MoO_4$ is within a range of 0.002 M-0.008 M, and a concentration of $K_2PtCl_4$ is within a range of 0.002 M-0.008 M. After cleaning a deposition substrate, the deposition substrate is placed in the mixed solution for the constant current electrodeposition. The prepared sample is then cleaned with deionized water and dried.

In some embodiments, in operation (3), a current density of the constant current electrodeposition is within a range of 1 A/cm$^2$-4 A/cm$^2$, and a deposition time is within a range of 90 s-360 s.

In some embodiments, in operation (4), an immersion time of the six-membered high-entropy foam in the ultrapure water is 15 min.

Example 1

1) working electrodes were placed in a mixed solution containing $NiSO_4$, $Fe_2(SO_4)_3$, $CuSO_4$, $CoSO_4$, $Na_2MoO_4$, $K_2PtCl_4$, $Na_3C_6H_5O_7$, $H_3BO_3$, and $(NH_4)_2SO_4$;

2) constant current electrochemical deposition was performed;

In step 1), in the mixed solution, a concentration of $NiSO_4$ was 0.003 M, a concentration of $Fe_2(SO_4)_3$ was 0.0011 M, a concentration of $CuSO_4$ was 0.0005 M, a concentration of $CoSO_4$ was 0.0015 M, a concentration of $Na_2MoO_4$ was 0.004 M, a concentration of $K_2PtCl_4$ was 0.004 M, a concentration of $(NH_4)_2SO_4$ was 0.4 M, a concentration of $Na_3C_6H_5O_7$ was 0.2 M, and a concentration of $H_3BO_3$ was 0.3 M.

In step 2), a current density of the constant current electrodeposition was 4 A/cm$^2$ and a deposition time was 180 s.

Figure 2:
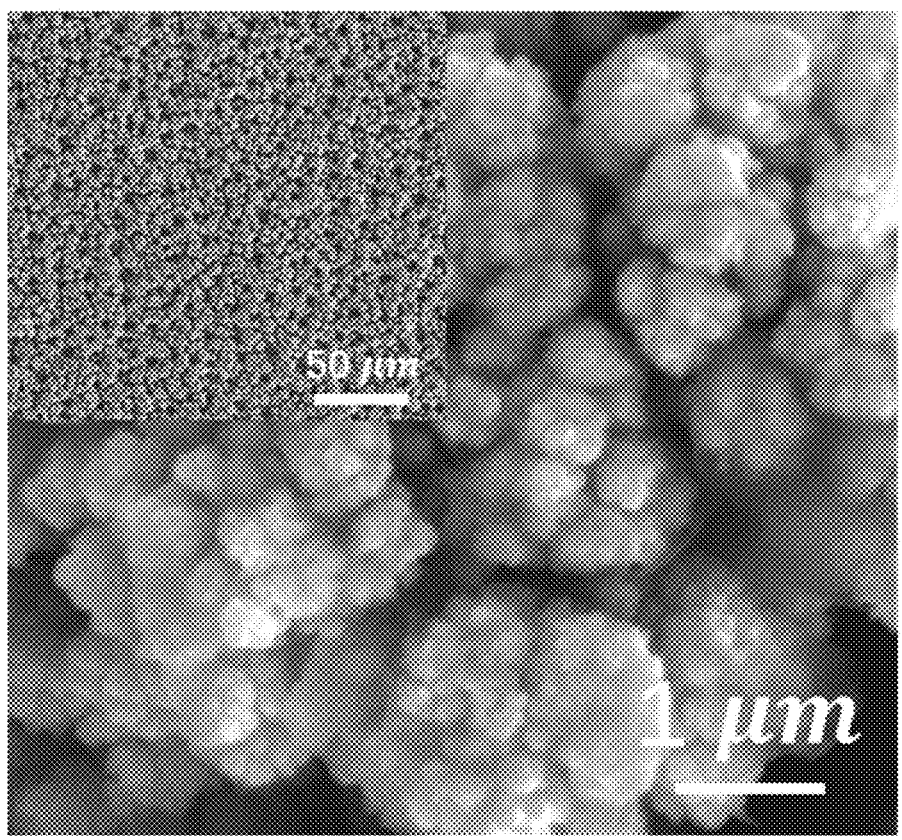
FIG. 2 is a diagram illustrating a low magnification morphological image and a high magnification morphological image of a NiFeCuCoMoPt high-entropy alloy foam captured by a scanning electron microscope according to some embodiments of the present disclosure.
Figure 3:
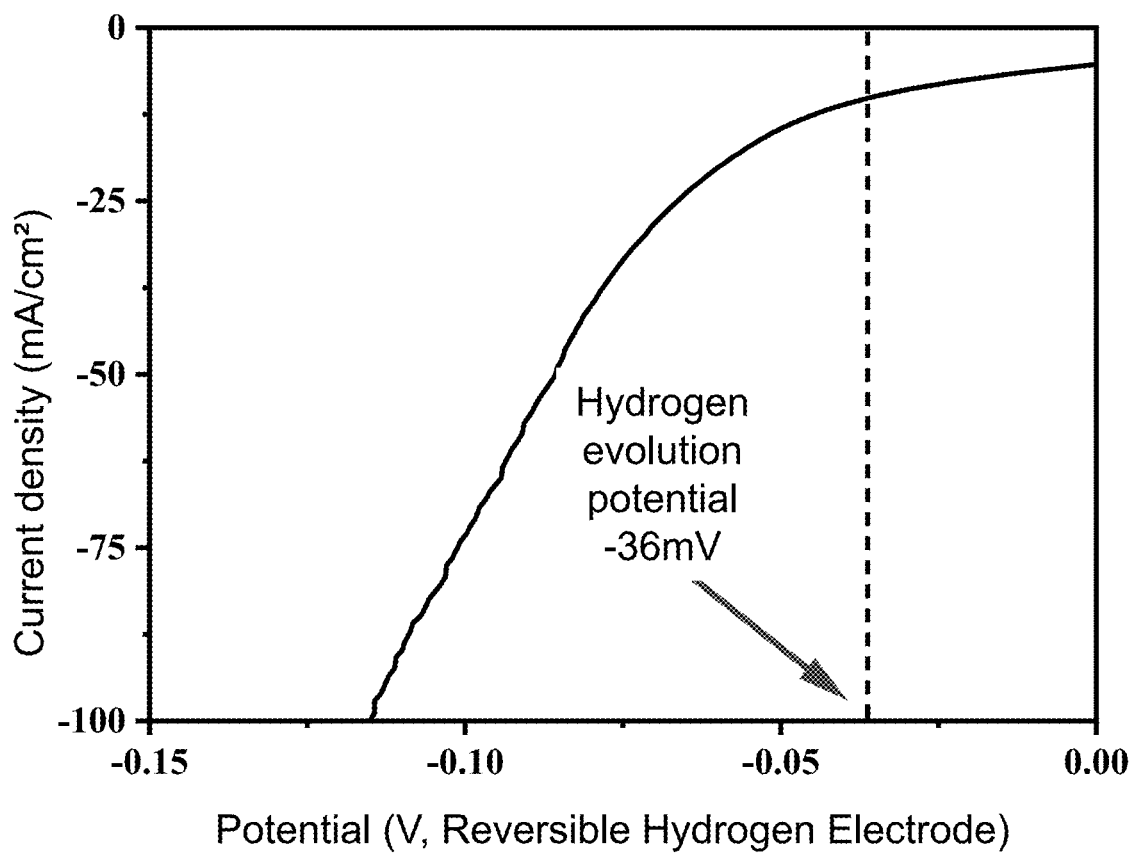
FIG. 3 is a diagram illustrating linear scan of hydrogen evolution reaction on a surface of a NiFeCuCoMoPt high-entropy alloy foam according to some embodiments of the present disclosure.
Figure 4:
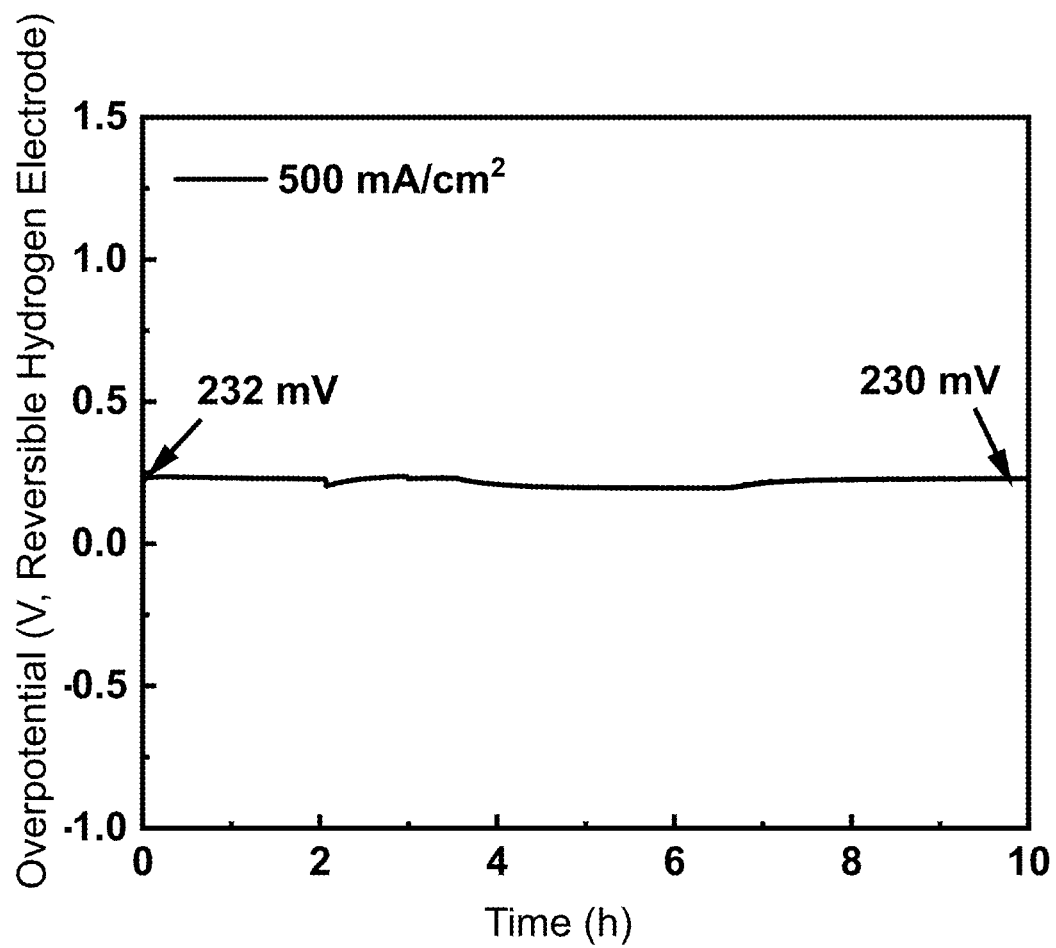
FIG. 4 is a diagram illustrating a stability test of a NiFeCuCoMoPt high-entropy alloy foam at 500 mA/cm$^2$ according to some embodiments of the present disclosure.
Figure 5:
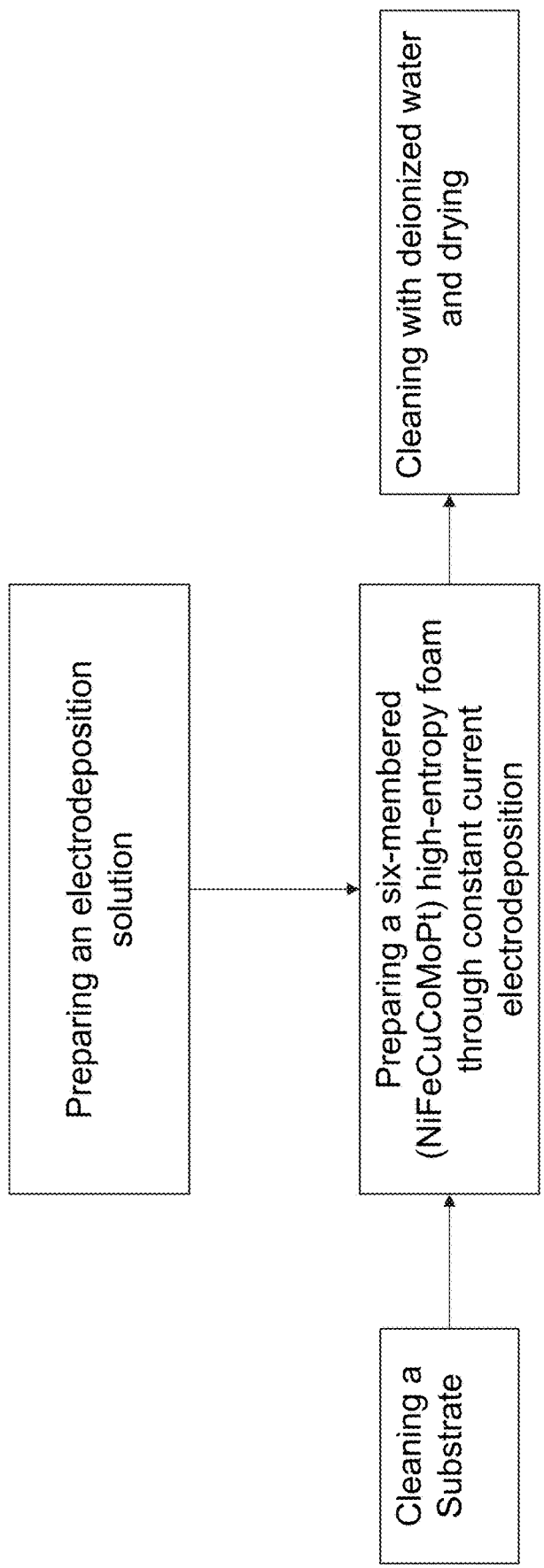
FIG. 5 is a flowchart illustrating a preparation method for the NiFeCuCoMoPt high-entropy alloy foam according to some embodiments of the present disclosure.

A foam prepared through the above steps consists of Ni, Fe, Cu, Co, Mo and Pt, and according to an energy-dispersive spectrum composition analysis (as shown in FIG. 1), the foam comprises 20 at % of Ni, 20 at % of Fe, 16 at % of Cu, 17 at % of Co, 12 at % of Mo, and 15 at % of Pt. According to observation using a scanning electron microscope (as shown in FIG. 2), the foam has a large number of 3D-connected micron-scale pores whose diameters are within 25 um; walls of the micron-scale pores are composed of NiFeCuCoMoPt particles packing, sizes of the particles are within a range of 100 nm-300 nm. After cleaning and activation, a hydrogen evolution overpotential of a surface of the foam is low as 36 mV, the hydrogen evolution overpotential is taken as a potential applied at a current density of 10 mA/cm$^2$ (as shown in FIG. 3). Additionally, a stability test was conducted at industrial-level current density at 500 mA/cm$^2$ for 10 h, indicating that a catalytic activity remains unchanged (as shown in FIG. 4).

Example 2

1) working electrodes were placed in a mixed solution containing NiSO$_4$, Fe$_2$(SO$_4$)$_3$, CuSO$_4$, CoSO$_4$, Na$_2$MoO$_4$, K$_2$PtCl$_4$, Na$_3$C$_6$H$_5$O$_7$, H$_3$BO$_3$, and (NH$_4$)$_2$SO$_4$;
2) constant current electrodeposition was performed;

In step 1), in the mixed solution, a concentration of NiSO$_4$ concentration was 0.003 M, a concentration of Fe$_2$(SO$_4$)$_3$ was 0.0011 M, a concentration of CuSO$_4$ was 0.0005 M, a concentration of CoSO$_4$ was 0.0015 M, a concentration of Na$_2$MoO$_4$ was 0.004 M, a concentration of K$_2$PtCl$_4$ was 0.004 M, a concentration of (NH$_4$)$_2$SO$_4$ was 0.4 M, a concentration of Na$_3$C$_6$H$_5$O$_7$ was 0.2 M, and a concentration of H$_3$BO$_3$ was 0.3 M.

In step 2), a current density of the constant current electrodeposition was 2 A/cm$^2$ and a deposition time was 180 s.

A foam prepared by the above steps consists of Ni, Fe, Cu, Co, Mo, and Pt, comprising 18 at % of Ni, 16 at % of Fe, 18 at % of Cu, 14 at % of Co, 14 at % of Mo, and 20 at % of Pt; the foam has a large number of 3D-connected micron-scale pores whose diameters are within 10 um; walls of the micron-scale pores are composed of NiFeCuCoMoPt particles packing, and sizes of the particles are within a range of 100 nm-200 nm; catalyst loading of the high-entropy foam is 1.5 mg/cm$^2$, and a hydrogen evolution overpotential of a surface of the high-entropy foam after cleaning and activation is low as 50 mV.

Example 3

1) working electrodes were placed in a mixed solution containing NiSO$_4$, Fe$_2$(SO$_4$)$_3$, CuSO$_4$, CoSO$_4$, Na$_2$MoO$_4$, K$_2$PtCl$_4$, Na$_3$C$_6$H$_5$O$_7$, H$_3$BO$_3$, and (NH$_4$)$_2$SO$_4$;
2) constant current electrochemical deposition was performed;

In step 1), in the mixed solution, a concentration of NiSO$_4$ was 0.003 M, a concentration of Fe$_2$(SO$_4$)$_3$ was 0.0011 M, a concentration of CuSO$_4$ was 0.0005 M, a concentration of CoSO$_4$ concentration was 0.0015 M, a concentration of Na$_2$MoO$_4$ was 0.004 M, a concentration of K$_2$PtCl$_4$ was 0.004 M, a concentration of (NH$_4$)$_2$SO$_4$ was 0.4 M, a concentration of Na$_3$C$_6$H$_5$O$_7$ was 0.2 M, and a concentration of H$_3$BO$_3$ was 0.3 M.

In step 2), a current density of the constant current electrodeposition was 1.0 A/cm$^2$ and a deposition time was 180 s.

A foam prepared by the above steps consists of Ni, Fe, Cu, Co, Mo, and Pt, comprising 20 at % of Ni, 20 at % of Fe, 19 at % of Cu, 15 at % of Co, 13 at % of Mo, and 13 at % of Pt; the foam has a large number of 3D-connected micron-scale pores whose diameters are within 5 um; walls of the micron-scale pores are composed of NiFeCuCoMoPt particles packing, and sizes of the particles are within a range of 50 nm-100 nm; catalyst loading of the high-entropy foam is 1.1 mg/cm$^2$, and a hydrogen evolution overpotential of a surface of the high-entropy foam after cleaning and activation is 54 mV.

Example 4

1) working electrodes were placed in a mixed solution of NiSO$_4$, Fe$_2$(SO$_4$)$_3$, CuSO$_4$, CoSO$_4$, Na$_2$MoO$_4$, K$_2$PtCl$_4$, Na$_3$C$_6$H$_5$O$_7$, H$_3$BO$_3$, and (NH$_4$)$_2$SO$_4$;
2) constant current electrodeposition was performed;

In step 1), in the mixed solution: a concentration of NiSO$_4$ was 0.003 M, a concentration of Fe$_2$(SO$_4$)$_3$ was 0.0011 M, a concentration of CuSO$_4$ was 0.0005 M, a concentration of CoSO$_4$ was 0.0015 M, a concentration of Na$_2$MoO$_4$ was 0.004 M, a concentration of K$_2$PtCl$_4$ was 0.004 M, a concentration of (NH$_4$)$_2$SO$_4$ was 0.4 M, a concentration of Na$_3$C$_6$H$_5$O$_7$ was 0.2 M, and a concentration of H$_3$BO$_3$ was 0.3 M.

In step 2), a current density of the constant current electrodeposition was 2.0 A/cm$^2$ and a deposition time was 360 s.

A foam prepared by the above steps consists of Ni, Fe, Cu, Co, Mo, and Pt, comprising 15 at % of Ni, 22 at % of Fe, 18 at % of Cu, 13 at % of Co, 17 at % of Mo, and 15 at % of Pt; the foam has a large number of 3D-connected micron-scale pores whose diameters are within 10 um; walls of the micron-scale pores are composed of NiFeCuCoMoPt particles packing, sizes of the particles are within a range of 100 nm-200 nm; catalyst loading of the high-entropy foam is 3.1 mg/cm$^2$, and a hydrogen evolution overpotential of a surface of the high-entropy foam after cleaning and activation is 42 mV.

Example 5

1) working electrodes were placed in a mixed solution of NiSO$_4$, Fe$_2$(SO$_4$)$_3$, CuSO$_4$, CoSO$_4$, Na$_2$MoO$_4$, K$_2$PtCl$_4$, Na$_3$C$_6$H$_5$O$_7$, H$_3$BO$_3$, and (NH$_4$)$_2$SO$_4$;
2) constant current electrodeposition was performed;

In step 1), in the mixed solution, a concentration of NiSO$_4$ was 0.003 M, a concentration of Fe$_2$(SO$_4$)$_3$ was 0.001 M, a concentration of CuSO$_4$ was 0.0005 M, a concentration of CoSO$_4$ was 0.0015 M, a concentration of Na$_2$MoO$_4$ was 0.004 M, a concentration of K$_2$PtCl$_4$ was 0.004 M, a concentration of (NH$_4$)$_2$SO$_4$ was 0.4 M, a concentration of Na$_3$C$_6$H$_5$O$_7$ was 0.2 M, and a concentration of H$_3$BO$_3$ was 0.3 M.

In step 2), a current density of the constant current electrodeposition was 2 A/cm$^2$ and a deposition time was 180 s.

A foam prepared by the above steps consists of Ni, Fe, Cu, Co, Mo, and Pt, comprising 24 at % of Ni, 13 at % of Fe, 15 at % of Cu, 15 at % of Co, 17 at % of Mo, and 16 at % of Pt; the foam has a large number of 3D-connected micron-scale pores whose diameters are within 10 um; walls of the micron-scale pores are composed of NiFeCuCoMoPt particles packing, and sizes of the particles are within a range of 100 nm-200 nm; catalyst loading of the high-entropy foam is 1.4 mg/cm$^2$, and a hydrogen evolution overpotential of a surface of the high-entropy foam after cleaning and activation is 56 mV.

Finally, it should be understood that the embodiments described herein are used only to illustrate the principles of the embodiments of the present disclosure; other deformations may also fall within the scope of the present invention. Therefore, by way of example, and not as a limitation, alternative configurations of the embodiments of the present disclosure may be considered to be consistent with the teachings of the present disclosure. Accordingly, embodiments of the present disclosure are not limited to those embodiments expressly presented and described herein.

What is claimed is:

1. A six-membered foam for hydrogen production by water splitting, consisting of: 10 at %-25 at % of Ni, 10 at %-25 at % of Fe, 10 at %-25 at % of Cu, 10 at %-25 at % of Co, 10 at %-25 at % of Mo, and 10 at %-25 at % of Pt.

2. The six-membered foam for hydrogen production by water splitting of claim 1, wherein the six-membered foam is filled with 3D-connected micron-scale pores.

3. The six-membered foam for hydrogen production by water splitting of claim 2, wherein diameters of the micron-scale pores are within a range of 0.2 um-25 um; and walls of the micron-scale pores are composed of aggregates of NiFeCuCoMoPt particles.

4. The six-membered foam for hydrogen production by water splitting of claim 3, wherein sizes of the NiFeCuCoMoPt particles are within a range of 100 nm-300 nm.

5. The six-membered-foam for hydrogen production by water splitting of claim 1, wherein catalyst loading of the six-membered foam is within a range of 0.8 mg/cm$^2$-3.2 mg/cm$^2$, and a hydrogen evolution overpotential of a surface of the six-membered foam after cleaning and activation is within a range of 36 mV-60 mV.

6. A method for preparing a six-membered foam for hydrogen production by water splitting, wherein the six-membered foam consists of: 10 at %-25 at % of Ni, 10 at %-25 at % of Fe, 10 at %-25 at % of Cu, 10 at %-25 at % of Co, 10 at %-25 at % of Mo, and 10 at %-25 at % of Pt, the method comprising:

operation (1), obtaining a colorless and transparent solution by dissolving complexes $(NH_4)_2SO_4$, $Na_3C_6H_5O_7$, and $H_3BO_3$ in ultrapure water under stirring;

operation (2), obtaining a mixed solution by dissolving metal salts $NiSO_4$, $Fe_2(SO_4)_3$, $CuSO_4$, $CoSO_4$, $Na_2MoO_4$, and $K_2PtCl_4$ in the colorless and transparent solution in sequence under stirring;

operation (3), obtaining an initial six-membered foam by using a Ni sheet as a working electrode and a Pt sheet as a counter electrode, controlling a temperature to 25° C., and performing constant current electrodeposition on the mixed solution;

operation (4), after the constant current electrodeposition is completed, obtaining a washed six-membered foam by immersing the initial six-membered foam in the ultrapure water to remove residual impurities on a surface of the initial six-membered foam and washing for three times; and operation (5), obtaining the six-membered (NiFeCuCoMoPt) foam by placing the washed six-membered foam in a freeze dryer and freeze-drying for 4 h.

7. The method for preparing the six-membered foam for hydrogen production by water splitting of claim 6, wherein in operation (1), in the colorless and transparent solution, a concentration of $(NH_4)_2SO_4$ is within a range of 0.4 M-0.6 M, a concentration of $Na_3C_6H_5O_7$ is within a range of 0.2 M-0.4 M, and a concentration of $H_3BO_3$ is within a range of 0.3 M-0.5 M.

8. The method for preparing the six-membered foam for hydrogen production by water splitting of claim 6, wherein in operation (2), in the mixed solution, a concentration of $NISO_4$ is within a range of 0.002 M-0.006 M, a concentration of $Fe_2(SO_4)_3$ is within a range of 0.001 M-0.002 M, a concentration of $CuSO_4$ is within a range of 0.0002 M-0.0006 M, a concentration of $CoSO_4$ is within a range of 0.001 M-0.003 M, a concentration of $Na_2MoO_4$ is within a range of 0.002 M-0.008 M, and a concentration of $K_2PtCl_4$ is within a range of 0.002 M-0.008 M.

9. The method for preparing the six-membered foam for hydrogen production by water splitting of claim 6, wherein in operation (3), a current density of the constant current electrodeposition is within a range of 1 A/cm$^2$-4 A/cm$^2$, and a deposition time is within a range of 90 s-360 s.

10. The method for preparing the six-membered foam for hydrogen production by water splitting of claim 6, wherein in operation (4), an immersion time of the initial six-membered foam in the ultrapure water is 15 min.

* * * * *